UNITED STATES PATENT OFFICE.

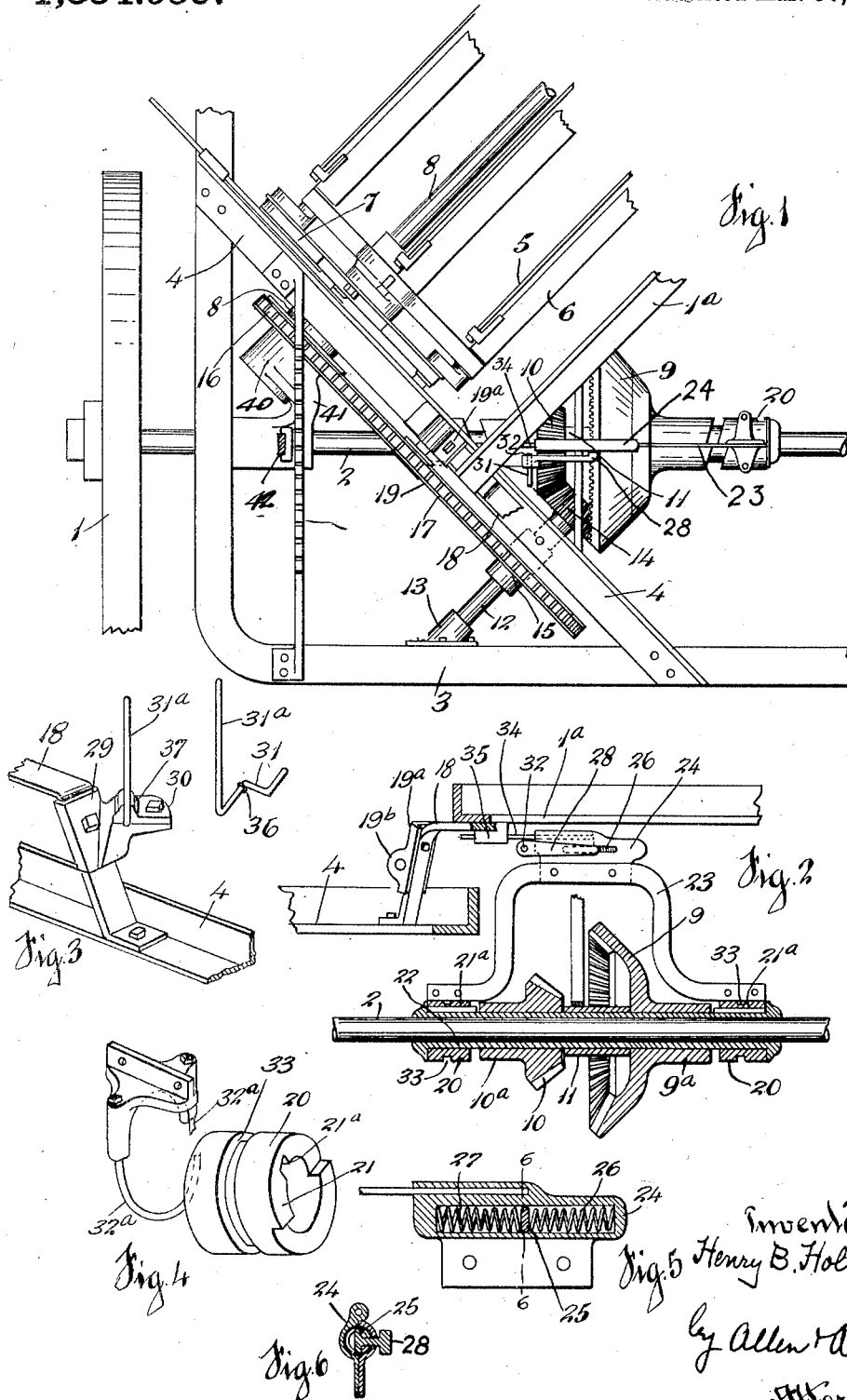

HENRY B. HOLTVOIGT, OF DAYTON, OHIO, ASSIGNOR TO THE OHIO RAKE COMPANY, OF DAYTON, OHIO, A CORPORATION OF OHIO.

COMBINED SIDE-DELIVERY RAKE AND TEDDER.

1,334,953.   Specification of Letters Patent.   Patented Mar. 30, 1920.

Application filed July 7, 1917. Serial No. 179,219.

*To all whom it may concern:*

Be it known that I, HENRY B. HOLT-VOIGT, a citizen of the United States, and a resident of Dayton, in the county of Montgomery and State of Ohio, have invented a certain new and useful Combined Side-Delivery Rake and Tedder, of which the following is a full, clear, and exact description, reference being had to the accompanying drawings, forming part of this specification.

My invention relates to side delivery rakes and tedders combined wherein there is provided a simple and efficient means for reversing the movement of the rake teeth dependent upon whether the device is to be used as a rake or a tedder.

It is the object of my invention to provide a strong and easily operated device for the above purposes, and particularly to provide for the reversing of the rake shaft in a side delivery rake which has the rake shaft journaled in a hanger on the carrying wheel axle of the rake, as shown in my Patent No. 1,240,451, dated September 18, 1917.

The above objects and other attendant advantages to be noted I accomplish by that certain construction and arrangement of parts to be hereinafter more specifically pointed out and claimed.

In the drawings:

Figure 1 is a top plan view of the operating end of the machine.

Fig. 2 is a detail longitudinal section through the beveled gears on the carrying axle showing the yoke and clutch collars for the reversing shift.

Fig. 3 is a detail perspective of the supporting device for the clutch crank arm.

Fig. 4 is a detail perspective of one of the collars and the engaging straps therefor.

Fig. 5 is a longitudinal sectional view of the pitman construction used in throwing the clutches.

Fig. 6 is a vertical section on the line 6, 6, of Fig. 5.

The machine has carrying wheels 1, and an axle 2 which turns with the wheels. Supported on the axle is the frame 3, having the transverse frame member 4 at the operating corner of the device. The rake bars 5 are supported on a reel 6, which reel is to be revolved by transmission of power from the axle 2, as will be described. An eccentric operated device 7 of any desired form serves to maintain the rake teeth which depend from the rake bars in a vertical position at all times. The reel has a shaft 8, known as the rake shaft, which when revolved carries around with it the reel.

Mounted on the axle of the device is a loose internally toothed beveled gear 9 and a loose externally toothed beveled gear 10, both of said gears being preferably spaced by a sleeve 11. A stub shaft 12 is provided which is journaled at 13 on the frame 3 and also journaled in a boss (not shown) on the sleeve 11 and this shaft carries a beveled pinion 14 that is constantly in mesh with both the above beveled gears, one on each side of the pinion.

The stub carries a sprocket wheel 15 and the rake reel shaft carries a sprocket 16, which two sprockets are operatively connected by a chain 17. The transverse member 4 of the frame has on it a yoke frame piece or bracket 18 which carries a small idler sprocket 19 in any desired manner, such as on an adjustable plate 19$^a$ having a journal 19$^b$. This sprocket will keep the chain taut for driving it in either direction.

The hubs 9$^a$ and 10$^a$ of the gears 9 and 10 respectively have spirally cut clutch faces thereon so that the sprocket gear may be driven from either side, and so that when the small gear 10 is operatively connected with the axle the machine will work as a rake, and when the large gear 9 is connected it will work as a tedder in the reverse direction. This connection of the gears is accomplished by the clutch device which forms part of this invention.

Mounted on the axle at each end of the gear arrangement now described, there is a clutch collar 20, having a spirally cut clutch face 21 alike to those on the gear hubs. These collars have keyways 21$^a$ for the axle, or in the embodiment shown, for the sleeve 22 which covers the axle throughout this mechanism and takes the place thereof.

The two collars are connected by a yoke 23 which has mounted at its upper edge the piston cylinder member 24. This member supports a piston 25 that is held in the cylinder between two coiled springs 26, 27. The cylinder casing is slotted at the side so as to permit the so-called "piston" to be a mere arm which extends into the cylinder from the side of the casing. This piston is preferably integral with a bar 28 that extends parallel with the cylinder and by means of which the piston is operated.

Mounted in a journal formed by a casting 29 on the yoke frame portion 18 and a plate 30 on the casting, is the operating crank 31. The crank engages in a hole 32 in the bar 28, and by throwing over the upwardly extending portion or rod 31ª of the crank the yoke will be shifted. The yoke is connected to the clutch collars by means of straps 32ª that engage in grooves 33 in the collars. The straps are mounted on the two depending ends of the yoke.

The piston cylinder is held stationary on the frame by means of a rod 34 set in the upper end of the cylinder casing, said rod being held fast in a small socket piece 35 mounted on the frame portion 1ª.

There is preferably mounted inside of the journal for the operating crank a spring (not shown), which bears on a shoulder 36 on the crank, and tends to force the upwardly extending portion of the crank against the face of the journal. There is a notched lug 37 on the face of the upper plate forming this journal which will thus tend to hold the crank in a position with the upwardly extending rod thereof vertical, which position will leave both collars out of clutching position and the rake in "neutral," as the lug extends forwardly over the edge of the said plate so that the notch (not shown) will engage the crank rod.

For operating the device, the crank rod will be thrown one way or the other, which will bring the piston one way or the other in the cylinder on the yoke. This will force the yoke along the axle and bring one of the two clutch collars into meshing position. If the clutch faces do not happen to match at the time of throwing the clutch, the springs operating on the piston will hold the faces against each other until the clutching takes place. The crank rod will tend to remain in the position in which it is thrown because of the spring tension thereon which will hold it to the side of the lug 37 on the crank journal on which it is placed.

It can be seen that the usual side delivery rake structure is preserved in this device, and that the various gears, clutches and other attachments will be attachable to the usual frame members without difficulty. The operation is simple and sure and will not become displaced during operation or during neutral, which occurs in many agricultural implements.

The rake shaft 8 is mounted in the journal 40 on the outer end of the hanger 41, the front end of which hanger is journaled on the axle 2, and the hanger is rocked by the vertically extending hand lever 42 to raise and lower the shaft, as in my Patent No. 1,240,451, of September 18, 1917.

The rake shaft may be raised and lowered by means of the hand lever 42 without disturbing the mechanism above described, as the sprocket chain will permit the movement without any difficulty, and this without any vertical shifting of the idler 19 which as shown is mounted in fixed position on the frame. It is believed that the above description of the parts and operation thereof is sufficient, and that the advantages of the same are apparent where not explicitly pointed out.

It is not desired to have limitations implied in the claims from the failure above to point out alternative structures which do not depart from the spirit of my invention.

Having thus described my invention, what I claim as new and desire to secure by Letters Patent, is:—

1. In a side delivery rake a transmission and driving mechanism for use between a main axle and a slantingly disposed rake shaft mounted so as to be raised and lowered with relation to the main axle, comprising, a stub shaft mounted in the rake frame parallel with the rake shaft and provided with a driving sprocket, a driven sprocket on the rake shaft in the same plane as the driving sprocket, a chain drive between said sprockets, an internal and external gear loosely mounted on the main axle, a clutch device connecting either gear with the axle, and a gear on the stub shaft meshing constantly with both gears, whereby upon shifting of the clutch the rake shaft can be driven in either direction and the rake shaft shifted in height without disturbing the drive of the sprockets.

2. In a side delivery rake a transmission and driving mechanism for use between a main axle and a slantingly disposed rake shaft mounted so as to be raised and lowered with relation to the main axle, comprising, a stub shaft mounted in the rake frame parallel with the rake shaft and provided with a driving sprocket, a driven sprocket on the rake shaft in the same plane as the driving sprocket, a chain drive between said sprockets, an internal and external gear loosely mounted on the main axle, clutch collars sliding on the axle for forward and reverse driving, said collars being connected together by a yoke, and resilient means for moving said yoke axially of the axle to connect either gear therewith, and a gear on the stub shaft meshing constantly with both gears whereby upon shifting of the collars the rake shaft can be driven in either direction and the rake shaft shifted in height without disturbing the drive of the sprockets.

3. In a side delivery rake a transmission and driving mechanism for use between a main axle and a slantingly disposed rake shaft mounted so as to be raised and lowered with relation to the main axle, comprising, a stub shaft mounted in the rake frame parallel with the rake shaft and provided with a driving sprocket, a driven sprocket on the rake shaft in the same plane as the driving sprocket, a chain drive between said sprockets, an internal and external gear loosely mounted on the main axle, clutch collars sliding on the axle for forward and reverse driving, said collars being connected together by a yoke, and resilient means for moving said yoke axially of the axle to connect either gear therewith, means for operating said resilient means comprising a crank arm, having spring means for maintaining it in desired positions, and a gear on the stub shaft meshing constantly with both gears, whereupon shifting of the collars the rake shaft can be driven in either direction and the rake shaft shifted in height without disturbing the drive of the sprockets.

HENRY B. HOLTVOIGT.